United States Patent
Li (10) Patent No.: US 6,370,086 B2
(45) Date of Patent: Apr. 9, 2002

(54) ULTRASOUND SENSOR FOR DISTANCE MEASUREMENT

(76) Inventor: Shih-Hsiung Li, 8th Fl. -1, No. 23, Sec. 1, Hangchow S. Rd., Taipei (TW)

( * ) Notice: Subject to any disclaimer, the term of this patent is extended or adjusted under 35 U.S.C. 154(b) by 0 days.

(21) Appl. No.: 09/897,569

(22) Filed: Jul. 2, 2001

Related U.S. Application Data (63) Continuation-in-part of application No. 09/270,491, filed on Mar. 15, 1999, now Pat. No. 6,181,645.

(51) Int. Cl.$^7$ .......................... G01S 7/521; G01S 15/93; H04R 17/00; B60R 21/00
(52) U.S. Cl. .................. 367/178; 367/140; 310/334
(58) Field of Search ................. 367/140, 178, 367/188; 310/322, 324, 334, 335; 73/649

(56) References Cited

U.S. PATENT DOCUMENTS

| | | |
|---|---|---|
| 4,437,032 A | 3/1984 | Gelhard |
| 4,500,977 A | 2/1985 | Gelhard |
| 5,446,332 A | 8/1995 | Rapps et al. |
| 5,600,610 A | 2/1997 | Hill et al. |
| 5,998,908 A * | 12/1999 | Goodson ................ 310/334 |
| 6,181,645 B1 | 1/2001 | Li |
| 6,268,683 B1 * | 7/2001 | Li ........................ 310/334 |

* cited by examiner

Primary Examiner—Ian J. Lobo
(74) Attorney, Agent, or Firm—Dellett and Walters (57) ABSTRACT

An ultrasound sensor has a housing, a piezoelectric ceramic element and a plurality of isolating layers received in the housing. The housing has a tapered rectangle chamber defined therein for receiving the piezoelectric ceramic element. The tapered rectangle chamber has a unique shape which is able to limit the shape of the emitted ultrasound signal by the piezoelectric ceramic element. The limited range of the ultrasound signals emitted by the piezoelectric ceramic element covers the entire cross section of the vehicle and will not cause a false alarm by reflection from the ground.

4 Claims, 9 Drawing Sheets

ULTRASOUND SENSOR FOR DISTANCE MEASUREMENT

CROSS REFERENCE

This is a continuation-in-part of the corresponding application Ser. No. 09/270,491 filed Mar, 15, 1999 now U.S. Pat. No. 6,181,645 issued to the same applicant on Jan. 30, 2001. The information within the corresponding U.S. patent is hereinafter taken for reference and incorporated therewith.

BACKGROUND OF THE INVENTION

1. Field of the invention

The present invention relates to an ultrasound sensor used to measure distance, and more particularly to a sensor for determining and indicating distances between vehicles and obstacles at close range using ultrasound techniques, wherein the sensor is able to generate a precise detecting area so as to avoid false activation of the sensor.

2. Description of related art

Figure 8:
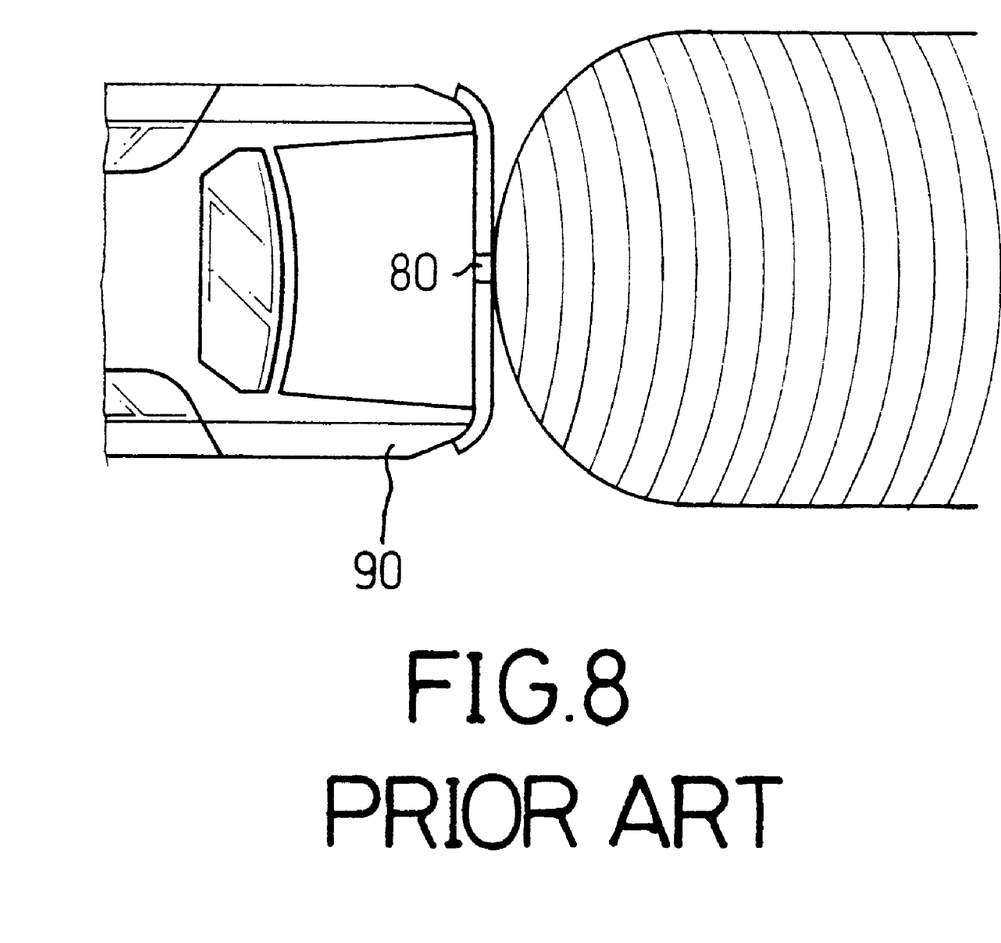
FIG. 8 is a schematic view showing a detecting area of a conventional ultrasound sensor.

With reference to FIG. 8, a conventional ultrasound sensor (80) is securely mounted on a rear portion of a vehicle (90), generally at the center of the vehicle (90). It is well know in the art that the sensor (80) comprises a piezoelectric ceramic to generate ultrasound signal beams and the scope of such ultrasound signal beams radiated is substantially a circular form. When the ultrasound signal beams reflected from an obstacle are received by the sensor (80), the sensor (80) is able to measure the distance between the vehicle (90) and the obstacle according to the time interval of the emitted and reflected ultrasound signal beams.

The scope shape defined by the ultrasound signal beams has always been an issue point of the ultrasound sensor improvement. As the foregoing mentioned sensor (80) has a circular form detecting scope, when a lower periphery of the detecting scope reaches the ground, the ultrasound signals are reflected and such a reflection will falsely warn the driver that the vehicle (90) is approaching an obstacle.

Figure 9:
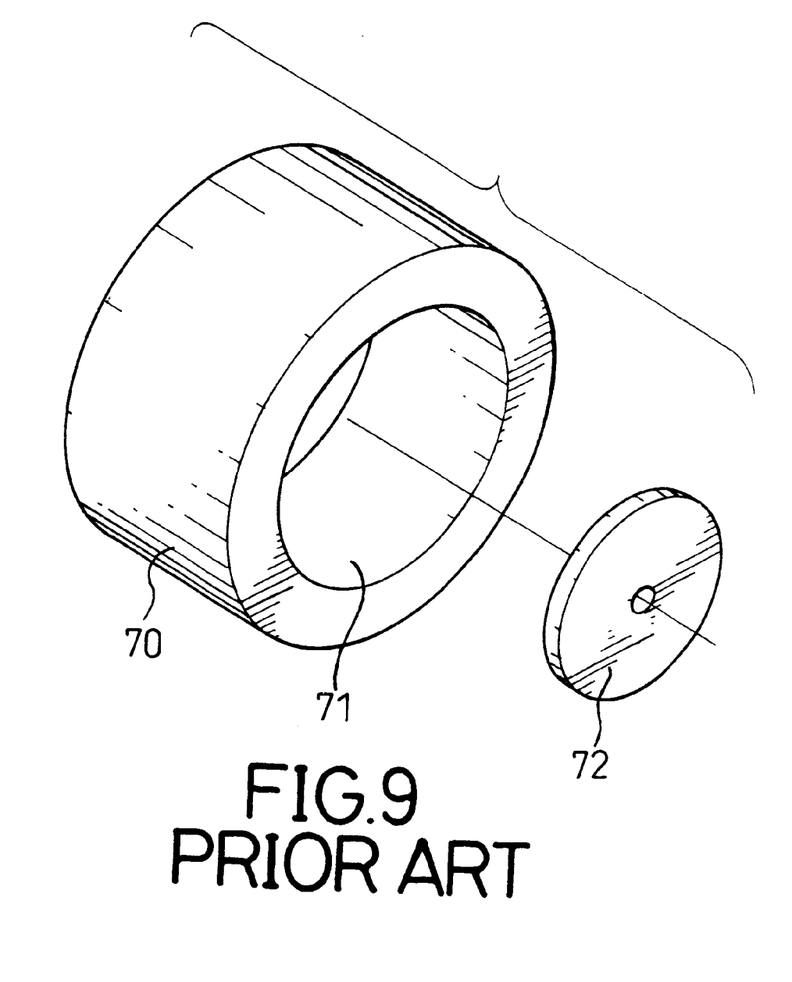
FIG. 9 is an exploded perspective view showing the elements of the conventional ultrasound sensor.
Figure 10:
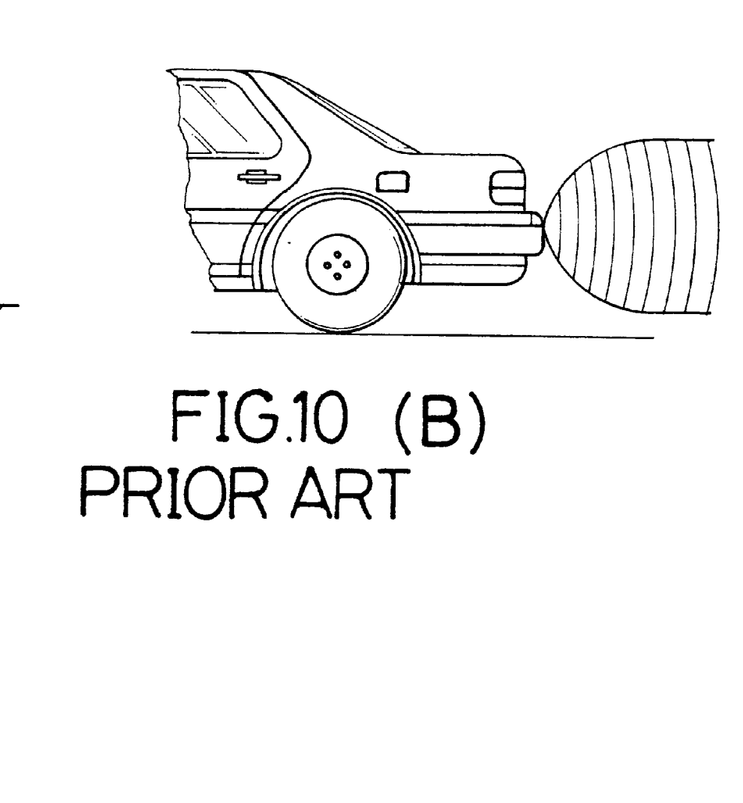
FIGS. 10A and 10B are schematic views showing the detecting area of the conventional sensor respectively from top and side view.

With reference to FIG. 9, a conventional sensor mainly comprises a housing (70) with a cylindrical chamber (71) and a piezoelectric ceramic element (72). The chamber (71) receives and seals the piezoelectric ceramic element (72) therein, and the inner diameter of the chamber (71) determines the detecting scope of the ultrasound signals. The smaller the inner diameter of the chamber (71) is, the larger detecting scope is formed (as shown in FIG. 8). On the contrary, the larger the inner diameter of the circular chamber (71) is, the smaller detecting scope is formed (as shown in FIGS. 10A and 10B). However, such a small detecting scope is not able to cover the entire cross sectional area of the vehicle.

Figure 11A:
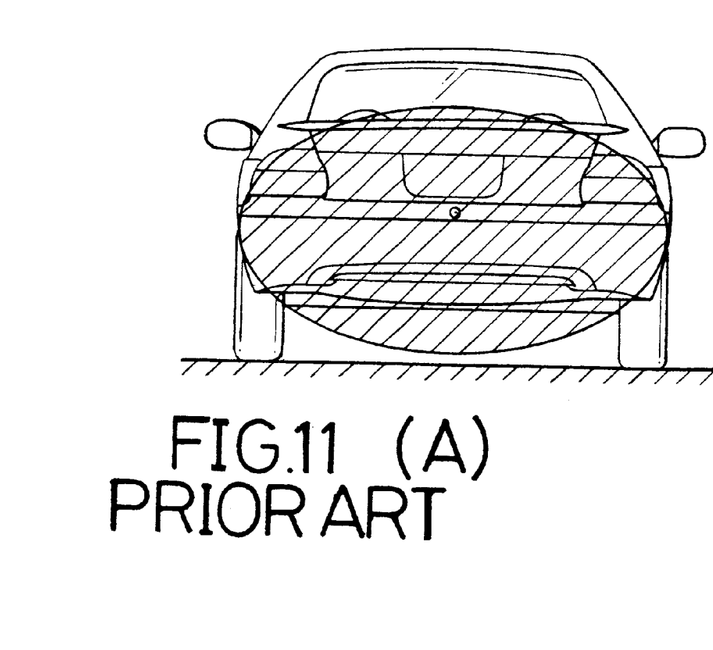
FIGS. 11A and 11B are schematic views showing the detecting area of another kind conventional sensor respectively from top and side view.
Figure 11B:
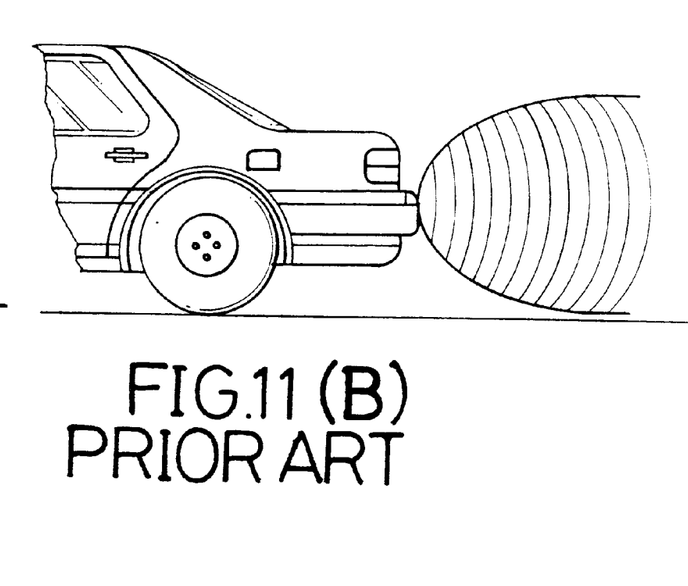

For the purpose of overcoming the aforementioned problems, another kind of sensor is disclosed. Such a sensor has an elliptical detecting scope (as shown in FIGS. 11A and 11B). Although the sensitivity of this sensor is better than the earlier cited art, the lower periphery of the elliptical detecting scope is still too close to the ground. Thus the possibility to generate a false warning message still can not be completely avoided.

To overcome the aforementioned problems, the invention provides an ultrasound sensor having a shape that is able to emit signals covering the entire cross sectional area of the vehicle without initiating a false alarm.

SUMMARY OF THE INVENTION

The primary objective of the present invention is to provide an ultrasound sensor having a shape to eliminate the possibility of activating a false alarm and to effectively alert the driver that the vehicle is approaching an obstacle.

To achieve the objective of the invention, the ultrasound sensor has a housing defining therein a substantially tapered rectangle chamber, a piezoelectric ceramic element received in the tapered rectangle chamber, and multiple isolating layers received in the tapered rectangle chamber on top of the piezoelectric ceramic element. The isolating layers comprise a silicon rubber layer, a cork layer and a felt layer.

Further objectives and advantages of the present invention will become apparent from a careful reading of the detailed description provided hereinafter, with appropriate reference to the accompanying drawings.

DETAILED DESCRIPTION OF THE PREFERRED EMBODIMENTS

Figure 1:
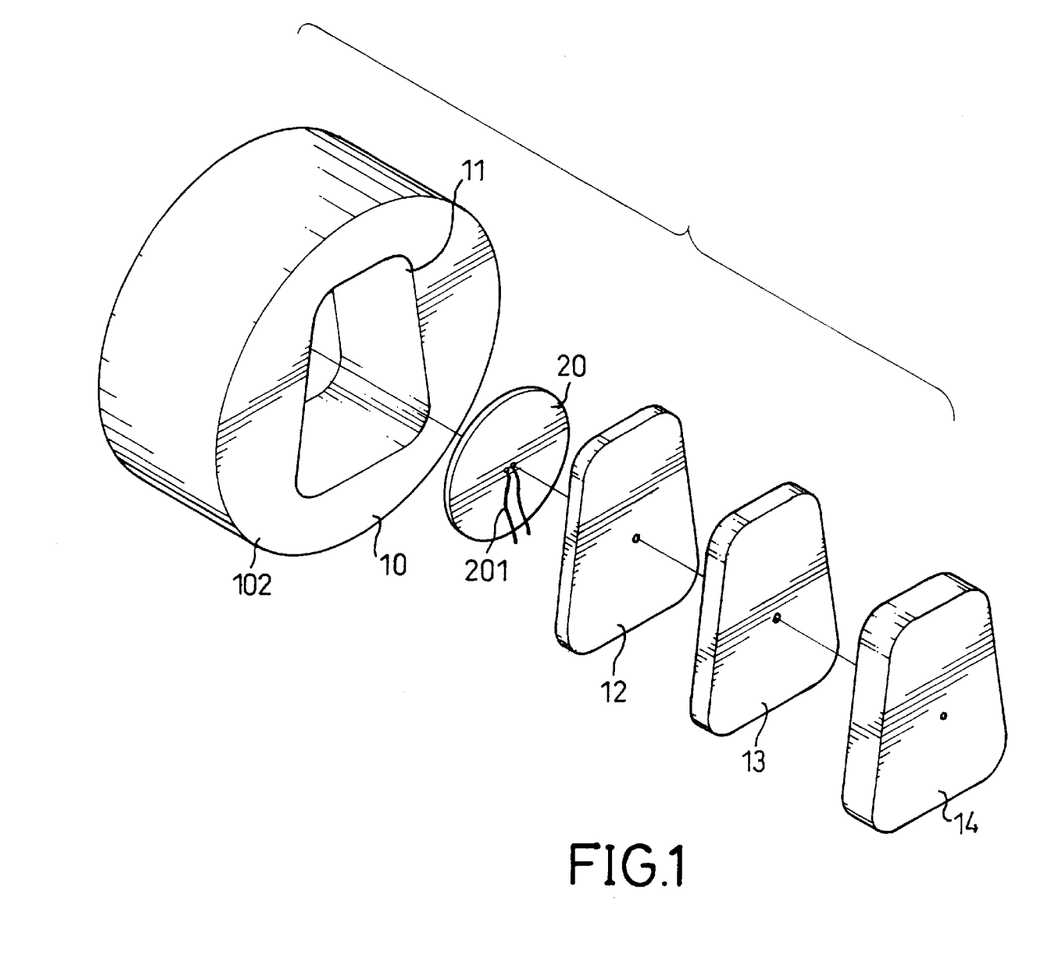
FIG. 1 is an exploded perspective view showing the elements of the invention.

With reference to FIG. 1, an ultrasound sensor in accordance with the invention comprises a housing (10) with a front face (102), a chamber (11) defined in the housing (10) and opening to the front face (102), a piezoelectric ceramic element (20) received in the chamber (11), and a plurality of isolating layers (12, 13 and 14) received in the chamber (11) and sequentially disposed in front of the piezoelectric ceramic element (20) for securing the piezoelectric ceramic element (20) in the chamber (11). The anode and the cathode of the piezoelectric ceramic element (20) are respectively provide with wires (201) to connect with a power source. Furthermore, the piezoelectric ceramic element (20) functions as an ultrasound transceiver so as to transmit and receive ultrasound signals.

Each isolating layer (12, 13 and 14) has a proper thickness and is defined with a hole for penetration by the wires (201). Sequentially, the isolating layers (12, 13 and 14) are chosen as a silicon rubber, a felt and a cork in this embodiment. The silicon rubber is provided for thermal isolation so as to eliminate an influence to the sensor incurred by surrounding temperature variations. The felt and the cork are provided for sound isolation.

Figure 2:
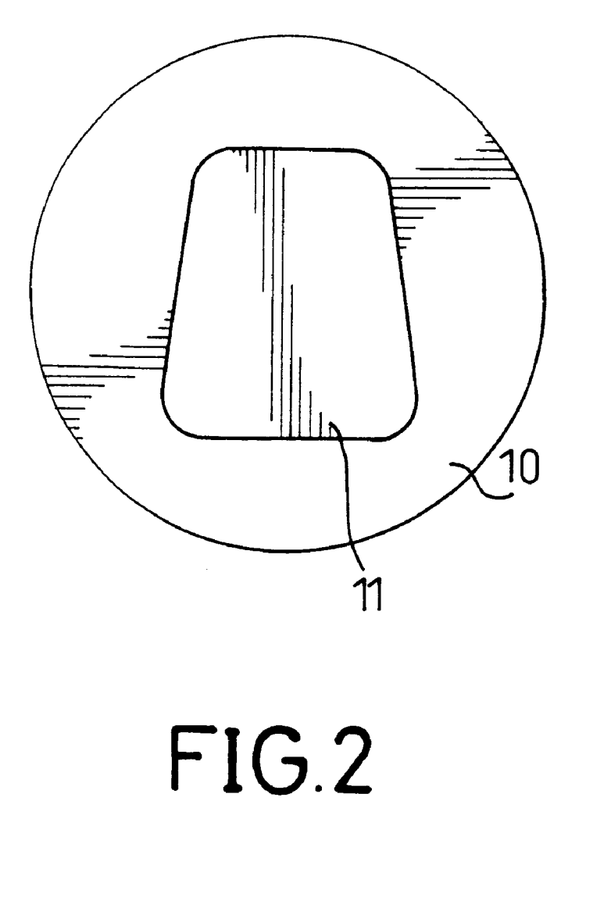
FIG. 2 is a front plan view showing the first embodiment of the invention.

With reference to FIG. 2, the shape of the chamber (11) is a tapered 4 rectangle shape, wherein the width of an upper portion of the chamber (11) is narrower than the width of a lower portion so as to form a substantially trapezoid shape. Such a specific shape of the chamber (11) is designed to generate a novel detecting area, and the isolating layers (13, 14,15) are configured to be matingly received in the chamber (11).

Figure 3:
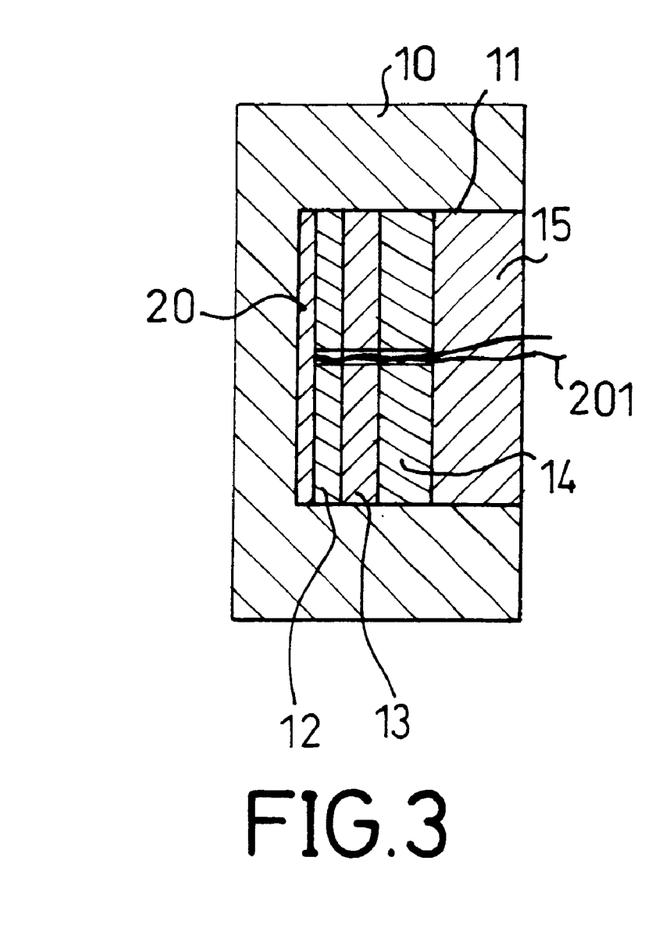
FIG. 3 is a side cross sectional view of the assembled invention.

With reference to FIG. 3, the assembled invention is shown, wherein the piezoelectric ceramic element (20), and the isolating layers (12, 13 and 14) are sequentially received in the chamber (1), and then a layer of silicon rubber (15) seals the aforementioned elements in the chamber (11).

Figure 4:
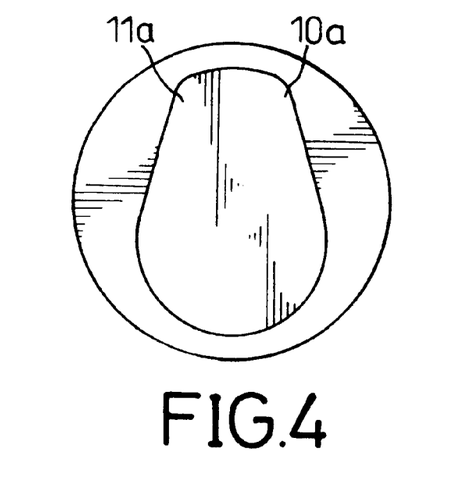
FIG. 4 is a front plan view showing a second embodiment of the invention.
Figure 5:
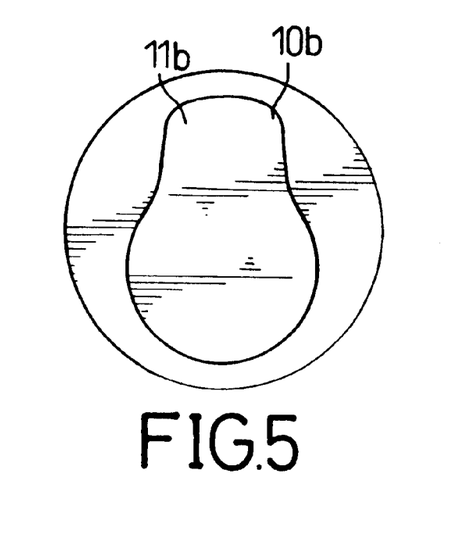
FIG. 5 is a front plan view showing a third embodiment of the invention.

With reference to FIGS. 4 and 5, a second and a third embodiment of the invention are shown, wherein both the embodiments are substantially the same as the first embodiment, the only change is the shape of the chamber (11)and the isolating layers (13, 14, 15). In the second embodiment, the shape of the chamber (11a) is substantially formed as a truncated teardrop shape, and the shape of the chamber (11b) in the third embodiment is like a calabash.

Figure 6:
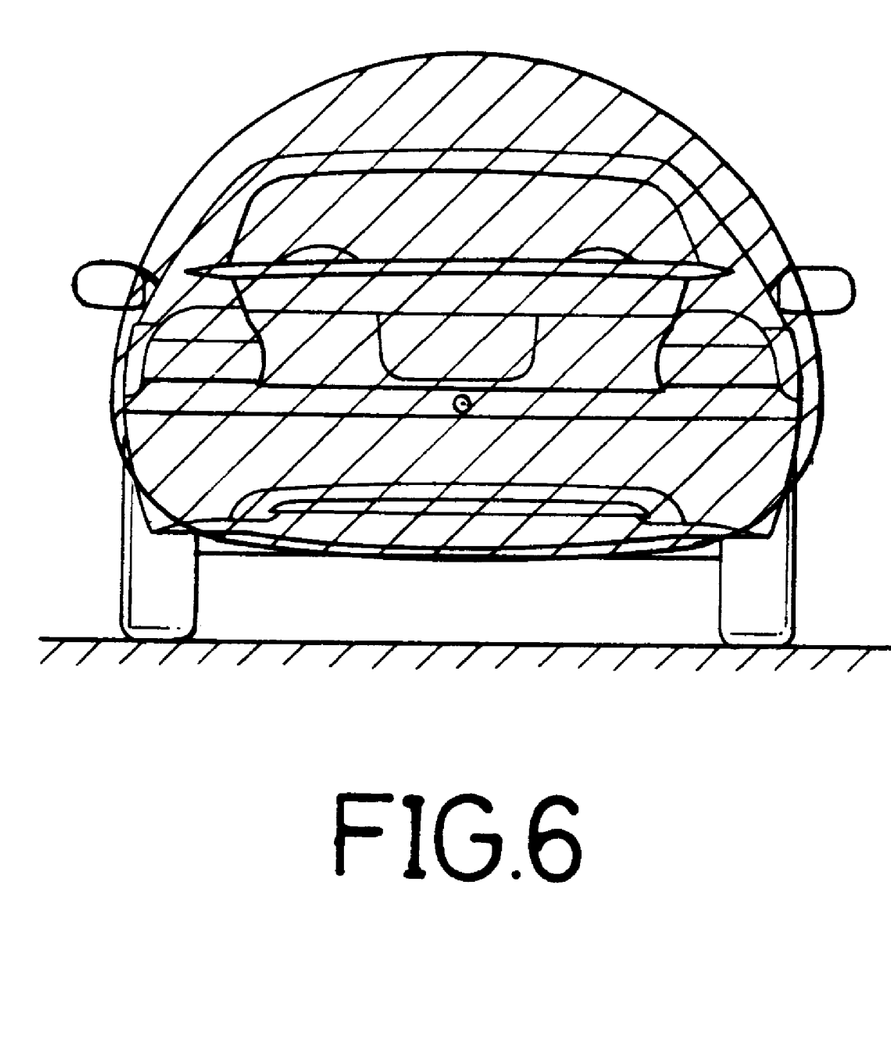
FIG. 6 is a schematic view showing a detecting area of the ultrasound sensor of the invention.
Figure 7:
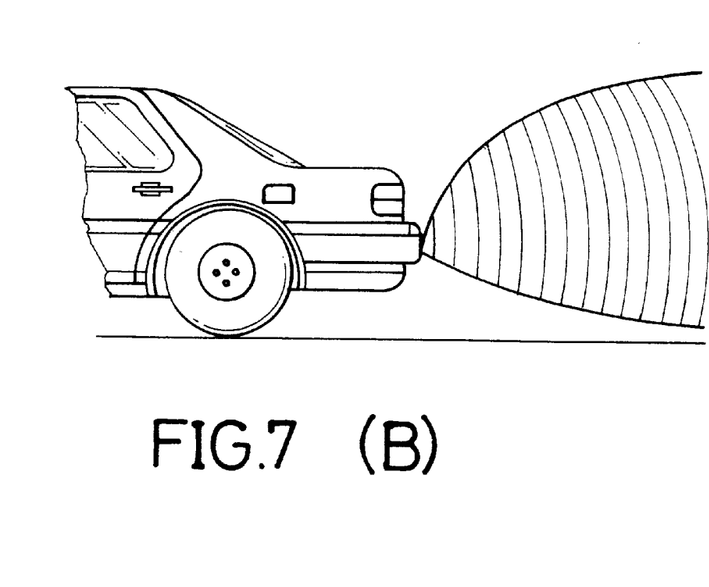
FIGS. 7A and 7B are schematic views showing the detecting area of the ultrasound sensor of the invention respectively from top and side view.

With reference to FIG. 6, the cross-sectional shape of the detecting area generated by the ultrasound sensor is shown. Due to the tapered rectangle shape of the chamber (11), the cross-sectional detecting area has a substantially flat lower edge and an arcuate upper edge and the detecting area resulting therefrom is enough to cover the entire width of the vehicle (as shown in FIG. 7A). Thus the potential of a false alarm generated by ultrasound signals being too close to the ground is eliminated (as shown in FIG. 7B).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. It should also be noted that those skilled in the art are able to make amendment, alterations and changes according to the detailed description of the preferred embodiment. However, those alternations, changes and\or amendments should also be included in the principle of the invention and claimed in the appended claims.

What is claimed is:

1. An ultrasound sensor for distance measurement, the ultrasound sensor comprising:

a housing (10) with a front face (102) defining therein a tapered rectangle chamber (11);

a piezoelectric ceramic element (20) received in the tapered rectangle chamber (11) and having wires (201) extending from an anode and a cathode thereof to a power source; and a plurality of tapered rectangle isolating layers (12, 13, 14) matingly received in the tapered rectangle shape chamber (11) and sequentially extending between the piezoelectric ceramic element (20) and the front face (102) of the housing (10);

wherein due to the shape of the tapered rectangle chamber (11), the piezoelectric ceramic element (22) generates a specific detecting area having a flat lower edge and an arcuate upper edge.

2. The ultrasound sensor as claimed in claim 1, wherein the plurality of tapered rectangle isolating layers (12, 13, 14) are a silicone rubber plate, felt and cork respectively.

3. The ultrasound sensor as claimed in claim 1, wherein the outermost tapered rectangle isolating layer (14) is coated with a silicone rubber layer (15) to seal the housing (10).

4. The ultrasound sensor as claimed in claim 2, wherein the cork layer is coated with a silicone rubber layer (15) to seal the housing (10).

* * * * *